No. 675,945. Patented June 11, 1901.
C. B. GORDON.
PASTE POT OR JAR.
(Application filed Dec. 22, 1900.)
(No Model.)
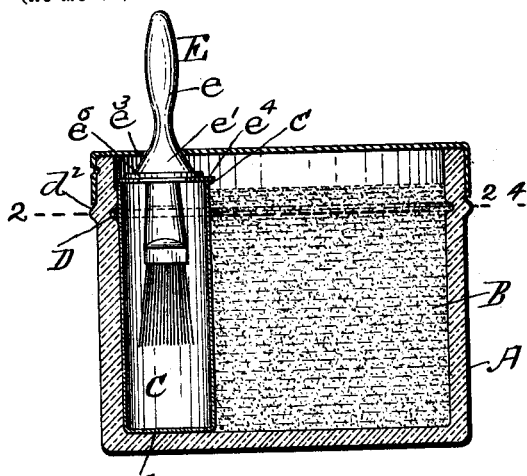
Fig. 1.
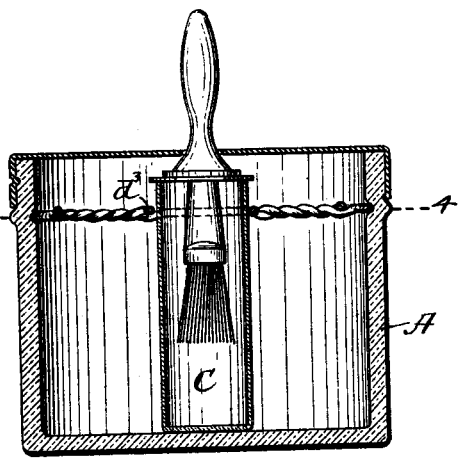
Fig. 3.
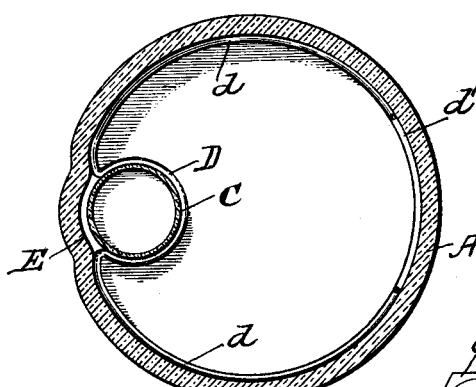
Fig. 2.
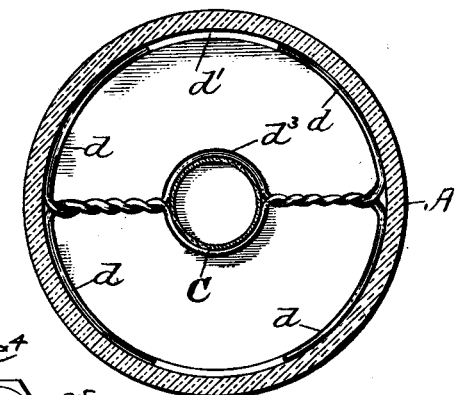
Fig. 4.
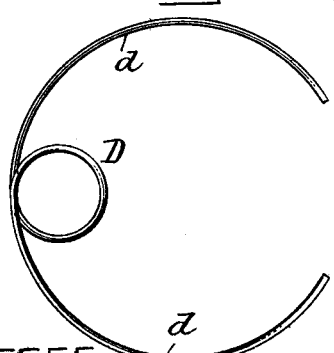
Fig. 5.
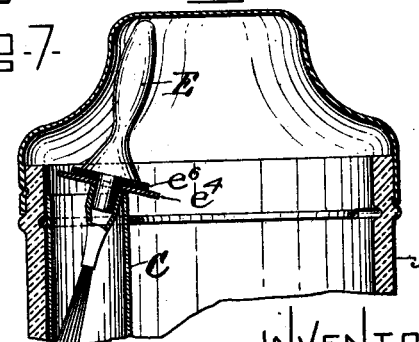
Fig. 6.
Fig. 7.
WITNESSES:
INVENTOR:
Charles B. Gordon
by his atty
Clarke & Raymond

UNITED STATES PATENT OFFICE.

CHARLES B. GORDON, OF NEWTON, MASSACHUSETTS, ASSIGNOR TO THE CARTER'S INK COMPANY, OF BOSTON, MASSACHUSETTS.

PASTE POT OR JAR.

SPECIFICATION forming part of Letters Patent No. 675,945, dated June 11, 1901.

Application filed December 22, 1900. Serial No. 40,777. (No model.)

*To all whom it may concern:*

Be it known that I, CHARLES B. GORDON, a citizen of the United States, residing at Newton, in the county of Middlesex and State of Massachusetts, have invented a new and useful Improvement in Paste Pots or Jars, of which the following is a full, clear, and exact description, reference being had to the accompanying drawings, forming a part of this specification, in explaining its nature.

The invention relates to a paste pot or jar having within it a means for holding water, comprising a vessel of any desired shape, of glass or any other suitable material, the lower end of which is closed and the upper end of which is open, and which is of substantially the height of the paste-holding chamber of the jar, and which vessel is held in the chamber by means of a holder consisting of wire, preferably of a spring-like nature, and arranged in the pot or jar, preferably near its top, and adapted to be contained in part in a horizontal channel or recess formed in the inner surface of the wall of the jar, and which holder is arranged to hold the vessel adjacent or against the wall of the pot or jar or in any other part of the pot or jar, the holder coöperating to some extent with the paste in holding the vessel, as it will be understood that in the first instance the pot or jar is filled with paste to about the level of the top of the vessel and that it sets around the vessel and becomes somewhat hard at atmospheric temperature—sufficiently hard to hold the vessel in place. As, however, the paste is used its value as a support for the vessel diminishes, and there then becomes necessary other means for holding the vessel in the jar. It is then that the wire holder becomes of value in maintaining the vessel in position in the jar.

I prefer that the holder be made of aluminium, or it may be made of any other material not discolored or attacked by the acids of the paste. It may be shaped to hold the vessel, as represented in Figure 5, or to coöperate with a recess in the side of the wall of the pot or jar, as represented in Fig. 2. Perhaps the last-named construction is the preferable one. It may be used to hold the vessel away from the wall of the jar, as shown in Fig. 4.

The vessel is used in connection with the paste by being filled or partially filled with water, the moisture of which softens the paste, while the water also serves to wet or moisten the brush which is used in applying the paste.

In the drawings, Fig. 1 is a view in vertical section of a paste-jar having the features of my invention. Fig. 2 is a view in horizontal section upon the dotted line 2 2 of Fig. 1. Fig. 3 is a view in vertical section of a paste-jar of modified construction. Fig. 4 is a view in horizontal section upon the dotted line 4 4 of Fig. 3. Fig. 5 is a view in plan of a modified form of holder, to which reference is hereinafter made. Fig. 6 is a view showing a modified form of cover. Fig. 7 is a view in plan of the brush.

Referring to the drawings, A represents the paste pot or jar; B, the paste, and C the shell or vessel for holding water, having the bottom $c$ and the opening $c'$.

D is the stay or brace, which holds or assists in holding the vessel in place in the jar. Its arms $d$ are in contact with the inner surface of the wall of the jar and preferably press against it with some pressure and may be contained in a recess $d'$, formed in the wall. It preferably is located near the top of the wall and opposite the bead $d^2$ in order that it may serve to stay and hold the vessel in the jar after the paste is used, especially when it is desired to scrape the water out from the brush against the edge of the vessel when the brush is to be used in the paste. It also serves to hold the vessel in the jar before and during the filling of the jar with paste. The stay or brace may hold the vessel against the side of the wall of the jar or, as represented in Fig. 2, in a recess E in the wall, in which case the wall of the recess or portions of it also serve to support or stay the vessel. The stay or brace may be formed to support the vessel removed from the wall, (see Fig. 4,) in which case it preferably has a ring or loop $d^3$ formed in it, which is of a size to receive the vessel.

In Figs. 1 and 3 I have shown the jar provided with a removable cap, in which is a hole of sufficient size to receive the portion $e$ of the handle E, which is represented above the cover. The handle has the conical enlargement $e'$, against which the edge $e^3$ of the handle-hole in the cap comes into contact when the jar is closed by the cap and the brush is in the position represented in Fig. 1. The brush is held from being pressed into the well by the cap by means of a thin metal plate $e^4$ below the conical section of the handle and which is large enough to rest upon the top of the water-well. This plate is represented in plan in Fig. 7 and has a number of straight edges $e^5$, which act as rests for the brush when it lies on its side and by means of which the brush is then prevented from turning. I prefer to interpose between the plate and the conical section of the handle a compressible washer $e^6$ in order that slight variations in the height of the space between the upper edge of the wall and the under surface of the cap may be compensated for by the yielding of the washer and a tight fit between the edge of the hole and the conical section of the brush be always maintained. This, of course, is upon the supposition that the cap is applied to the jar by a holding means, which requires that it always be closed to the same position. It is, of course, apparent that the cover may not have this holding means, and when it does not there will be no necessity for the use of the holding-washer on the brush, as the cap itself will then always be movable to bring the edge of its hole into contact with the conical section of the brush.

In Fig. 6 I have shown the cap as provided with an upward enlargement in the end of the dome and of sufficient height to hold within it the handle E of the brush when the brush is slightly tipped in the well, and this construction of cap does away with the necessity for a hole in it and also for the use of a yielding packing-washer.

Having thus fully described my invention, I claim and desire to secure by Letters Patent of the United States—

1. The improvement in paste pots or jars herein described, the same comprising a pot or jar for holding the paste, a shell or vessel forming a water-well contained in the jar and means for maintaining the shell or vessel in the jar comprising a holder of metal or suitable material held by the wall of the jar and engaging the upper portion of said vessel and formed to stay, or partially stay, the vessel in the jar whereby the said vessel will be maintained in upright position after the level of the paste has been considerably reduced in the jar, so that its edge may at all times be used to scrape the water from the brush, as described.

2. The combination of a paste pot or jar having its wall formed to provide a vertical recess for receiving in its chamber an independent vessel or shell contained in part in said recess and partially supported by the wall or portions of the wall thereof and independent means contained in the chamber and engaging the upper portion of said vessel for maintaining the vessel in contact with said wall or portions thereof of the recess.

3. The combination of a paste pot or jar having a chamber for holding paste and an independent vessel located therein, and means engaging the wall of the chamber and the upper portion of the said independent vessel for supporting said independent vessel at its top, whereby it will be held rigidly within said chamber after the level of the paste has been materially reduced, as described.

4. The combination of a paste pot or jar having a chamber for receiving paste, an exterior bead, an interior channel upon the line of said bead, said bead and channel being near the top of said paste pot or jar, a vessel-holder having arms to enter said channel and an independent vessel in the paste-chamber supported by said holder.

5. The combination of a paste pot or jar having a chamber for holding paste, an independent vessel contained in said chamber, and a holder for said vessel having spring or resilient arms, said holder engaging said vessel near its upper portion and its arms engaging the interior of said chamber near its top and adapted by their resiliency to be easily located within said chamber and removed therefrom, as described.

6. The combination of a paste-pot having a receptacle for holding paste, an independent vessel forming a water-well contained in the paste-holding chamber, a cover having a hole for receiving the handle of a brush, the brush having a handle provided with a conical section, a loose flange to rest on the vessel and a yielding compensator between the flange and the conical section of the handle, the hole in said cover being adapted to cooperate with the conical section of said brush-handle to cause said yielding compensator to engage the upper edge of said water-well, as described.

CHARLES B. GORDON.

In presence of—
RICHARD N. CARTER,
P. W. CUTTING.